United States Patent [19]

Osano et al.

[11] Patent Number: 5,604,620
[45] Date of Patent: Feb. 18, 1997

[54] LIGHT DEFLECTOR

[75] Inventors: Nagato Osano, Kawasaki; Susumu Ito, Tokyo; Hiroshi Saito, Kawasaki; Shiro Higashikozono, Tsukuba, all of Japan

[73] Assignee: Canon Kabushiki Kaisha, Tokyo, Japan

[21] Appl. No.: 474,969

[22] Filed: Jun. 7, 1995

Related U.S. Application Data

[63] Continuation of Ser. No. 400,265, Mar. 3, 1995, abandoned, which is a continuation of Ser. No. 734,699, Jul. 23, 1991, abandoned.

[30] Foreign Application Priority Data

| Jul. 26, 1990 | [JP] | Japan | 2-199483 |
| Feb. 19, 1991 | [JP] | Japan | 3-024459 |
| Jul. 12, 1991 | [JP] | Japan | 3-198775 |

[51] Int. Cl.⁶ ............................................... G02B 26/08
[52] U.S. Cl. ................. 359/196; 359/197; 359/212; 359/216; 359/850
[58] Field of Search ............................ 359/196, 197, 359/212, 582, 488, 850, 855, 216–219; 347/259–261

[56] References Cited

U.S. PATENT DOCUMENTS

| 4,322,130 | 3/1982 | Ito et al. ........................... 359/488 |
| 4,592,622 | 6/1986 | Hashimoto ........................ 359/218 |
| 5,126,873 | 6/1992 | Ang .................................... 359/217 |

FOREIGN PATENT DOCUMENTS

| 093921 | 11/1983 | European Pat. Off. . |
| 120240 | 10/1984 | European Pat. Off. . |
| 52-119331 | 10/1977 | Japan . |
| 58-184903 | 10/1983 | Japan . |
| 59-168411 | 9/1984 | Japan . |
| 61-026765 | 2/1986 | Japan . |
| 1082011 | 3/1989 | Japan . |

Primary Examiner—James Phan
Attorney, Agent, or Firm—Fitzpatrick, Cella, Harper & Scinto

[57] ABSTRACT

A light deflector for p-polarized light of wavelength λ includes a light deflector member of a material principally composed of an aluminum allow with an aluminum oxide file, formed on the deflecting reflection face(s) of the light deflector member. Optical film thickness (nd) of the aluminum oxide film is within a range of:

λ/11.1 to λ/5.0;

λ/4.11 to λ/2.89;

λ/1.73 to λ/1.47; or

λ/1.28 to λ/1.20 wherein reflectance of the incident light is substantially constant when the angle of incidence on the reflection face(s) is between 10° and 55°.

6 Claims, 11 Drawing Sheets

Aℓ + Aℓ2O3

LIGHT DEFLECTOR

This application is a continuation of application Ser. No. 08/400,265 filed Mar. 3, 1995, now abandoned, which is a continuation of application Ser. No. 07/734,699 filed Jul. 23, 1991, now abandoned.

BACKGROUND OF THE INVENTION

1. Field of the Invention

The present invention relates to a laser beam scanning optical device adapted for use in a laser beam printer, a copying machine utilizing image formation on a photosensitive member with a laser beam or the like, and more particularly to a light deflector for deflecting a laser beam from a light source.

2. Related Background Art

Such conventional laser beam scanning optical device generally employs a rotary polygon mirror as the light deflector for deflecting a light beam into scanning motion. Such rotary polygon mirror is generally composed of an aluminum alloy, a plastic material or glass, with a reflection increasing film on the reflective faces for light deflection. However, remarkable progress in the mirror surface finishing technology in recent years has put the optical mirror finishing with diamond grinding into practice and has enabled to provide a rotary polygon mirror formed by direct mirror finishing of aluminum or aluminum alloys.

The Japanese Laid-open Patent No. 58-184903 discloses a rotary polygon mirror formed by direct mirror finishing of aluminum or an aluminum alloy followed by formation of a transparent film by anodic oxidation on the finished mirror faces. Such anodized oxide film shows satisfactory adhesion to the underlying aluminum alloy, thus satisfactorily functioning as a protective film for the aluminum mirror face.

However, the anodized aluminum oxide film, disclosed in the above-mentioned Japanese Laid-open Patent No. 58-184903, is practically unusable, due to an excessively large variation in the reflection intensity depending on the incident angle, since the optical film thickness (nd) is designed as $m\lambda/2 \cdot \cos\theta$ (wherein m is a positive integer except zero, $\lambda$ is wavelength, and $\theta$ is incident angle) and the reflected light intensity is designed to become maximum in a core of an incident angle at the center of the scanning range.

SUMMARY OF THE INVENTION

In consideration of the foregoing, the object of the present invention is to provide a light deflector composed principally of aluminum with reduced dependence on the incident angle. This object can be attained, according to the present invention, by the formation of a protective aluminum oxide film of a predetermined optical thickness on reflective faces of the light deflector.

The light deflector of the present invention, for deflecting and scanning a light beam from a light source onto a scan face, is featured in that said deflector is formed by a material principally composed of aluminum and is provided, on the reflective faces thereof, with an aluminum oxide film with an optical thickness (nd) within a range of $\lambda/5.5-\lambda/4.3$, $\lambda/3.12-\lambda/2.23$, $\lambda/1.34-\lambda/1.28$, $\lambda/1.08-\lambda/0.95$ or $\lambda/0.64-\lambda/0.61$ wherein $\lambda$ is the wavelength of the deflected light beam, and wherein the incident light beam to the deflecting reflection face is S-polarized, namely polarized perpendicularly to the reflection section (plane including the incident light, reflected light and refracted light).

Also the light deflector of the present invention, for deflecting and scanning a light beam from a light source onto a scan face, is featured in that said light deflector is formed by a material principally composed of aluminum and is provided, on the reflective faces thereof, with an aluminum oxide film with an optical thickness (nd) within a range of $\lambda/11.1-\lambda/5.0$, $\lambda/4.11-\lambda/2.89$, $\lambda/1.73-\lambda/1.47$ or $\lambda/1.28-\lambda/1.20$, wherein $\lambda$ is the wavelength of the deflected light beam, and wherein the incident light beam to the deflecting reflection face is P-polarized, namely polarized parallel to the reflection section (plane including the incident light, reflected light and refracted light).

The above-explained structure allows to form the aluminum oxide film with an optimum thickness in consideration of the refractive index of the aluminum substrate, wavelength and angle of the incident light, thereby minimizing the dependence on the incident angle.

DESCRIPTION OF THE PREFERRED EMBODIMENTS

Figure 1:
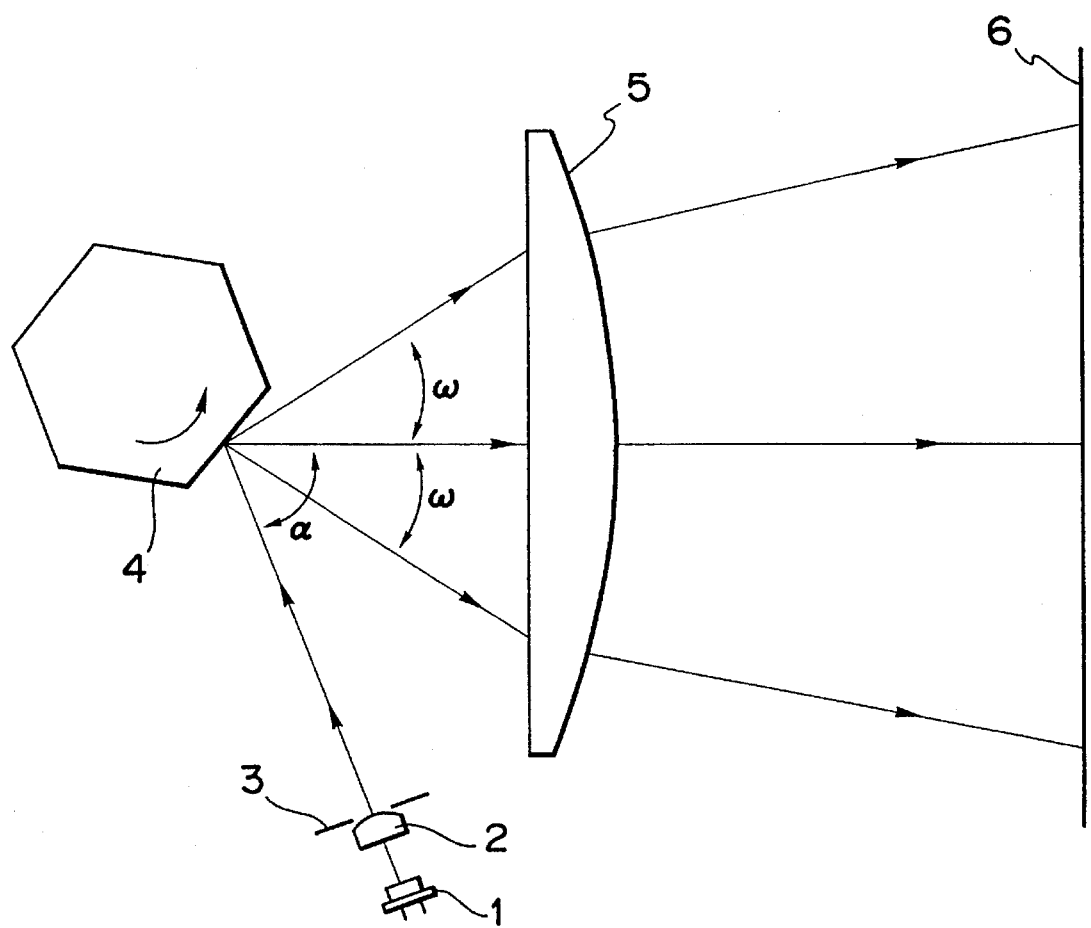
FIGS. 1 and 6 are plan views of a scanning optical device utilizing the rotary polygon mirror of the present invention.

FIG. 1 is a plan view of a scanning optical device employing the rotary polygon mirror of the present invention, showing the function in a plane parallel to the deflection plane (a plane formed in time by the light beam deflected by the deflecting reflection face of the light deflector).

Referring to FIG. 1, a light beam emitted from a semiconductor laser 1 constituting the light source is converted into a substantially parallel beam by a collimating lens 2. In the vicinity of said lens there is provided a diaphragm 3 for defining the size of the light beam. The light beam transmitted by the diaphragm 3 enters a rotary polygon mirror 4, which is rotated at a high speed in a direction indicated by an arrow, whereby the incident light beam is deflected into a high-speed scanning motion. The deflected light beam is subjected to correction of f$\theta$ characteristics by an f$\theta$ lens 5, thereby being focused on a photosensitive member 6 constituting a scanned plane, and performing a linear scanning thereon.

Around the photosensitive member there are provided a corona charger for uniformly charging the surface of the photosensitive member, a developing unit for developing an electrostatic latent image formed on said photosensitive member into a visible toner image, and a transfer corona charger for transferring said toner image onto a recording sheet (all these components not shown), whereby information corresponding to the light beam generated by the semiconductor laser 1 is recorded on the recording sheet.

The effective light beam scanning angle is defined as $2\omega$ as shown in FIG. 1, and the angle between the light beam before entry into the rotary polygon mirror and the center of said effective deflection angle $2\omega$ is defined as $\alpha$. The incident angle and reflection angle of the light beam, with respect to the normal line to the reflection plane of the rotary polygon mirror 4 in the effective scanning range, vary with the rotation of the polygon mirror, and said varying range can be represented as $(\alpha-\omega)/2 \sim (\alpha+\omega)/2$.

If the polygon mirror has 6 reflecting faces with $\omega=47°$ and $\alpha=65°$, the incident angle $\theta$ of the light beam to the reflecting face varies within a range of $9°-56°$ by the rotation of the polygon mirror. The light from the semiconductor laser 1 is linearly polarized, and enters the polygon mirror in the S-polarized state. More specifically, the incident light beam to the deflecting reflection plane of the polygon mirror is S-polarized, namely polarized perpendicularly to the reflection section (plane including the incident light, reflected light and refracted light). Stated differently, the light entering the polygon mirror from the semiconductor laser is polarized perpendicularly to the deflecting plane.

The polygon mirror 4 is principally composed of aluminum, with an aluminum oxide film on the deflecting reflection faces.

Figure 2:
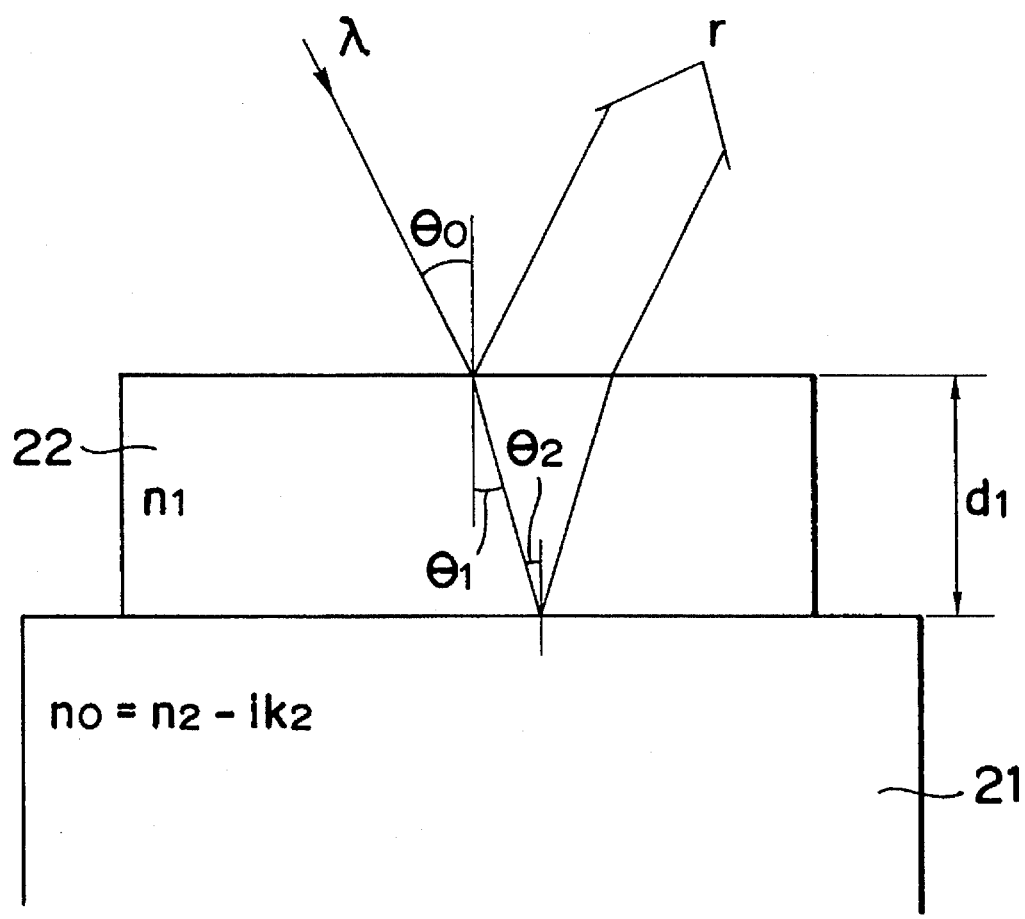
FIG. 2 is a schematic view of a transparent mono-layer film on a metal.

Now let us consider a transparent single-layer film on a metal, as schematically shown in FIG. 2.

When a mirror-finished aluminum alloy with a complex refractive index:

$$n_0 = n_2 - ik_2$$

is covered with an aluminum oxide film with a refractive index $n_1$ and light enters with an incident angle $\theta$ from an incident medium (air), refractive angles $\theta_1$, $\theta_2$ of a transparent layer 22 and a metal layer 21 can be represented as:

$$\theta_1 = \sin^{-1}\{(n_0 \sin\theta_0/n_1)\}$$

$$\theta_2 = \sin^{-1}\{(n_0 \sin\theta_0/(n_2 - ik_2)\}$$

Since $i = \sqrt{-1}$, $\theta_2$ becomes a complex number, which can be represented as:

$$\theta_2 = \alpha - \beta i$$

The Fresnel coefficient $r_{0s}$ of the S-component of the reflected light at the interface between the incident medium and the transparent layer is represented as:

$$r_{0s} = -\{\sin(\theta_0 - \theta_1)\}/\{\sin(\theta_0 + \theta_1)\}$$

while the Fresnel coefficient $r_{1s}$ of the S-component of the reflected light at the interface between the transparent layer and the metal layer is represented as:

$$r_{1s} = -\sin\{(\theta_1 = \alpha) - \beta i\}/\sin\{(\theta_1 + \alpha) + i\}.$$

$r_{0s}$, being a real number, can be represented as:

$$r_{0s} = r_{0s'}$$

while $r_{1s}$, being a complex number, can be represented as:

$$r_{1s} = r_{1s'} e^{i\phi_{1s}}$$

wherein $r_{1s'}$ represents the amplitude and $\phi_{1s'}$ represents the phase.

The delay $\omega_1$ in phase, resulting from reciprocations of the light with a wavelength $\lambda$ within the transparent layer with a geometrical film thickness $d_1$ can be represented as:

$$\psi_1 = 4\pi n_1 d_1 \cos\theta_1/\lambda.$$

Consequently the S-component $r_s$ of the synthesized amplitude reflectance by the interference between the light reflected at the interface between the incident medium and the transparent layer and the light reflected at the interface between the transparent layer and the metal layer is represented by:

$$r_s = \{r_{0s} + r_{1s'} e^{i(\phi_{1s} - \omega_1)}\}/\{1 + r_{0s} \cdot r_{1s'} e^{i(\phi_{1s} - \omega_1)}\} = r_{s'} e^{i\delta_s}$$

wherein $r_{s'}$ and $\delta_s$ respectively represent amplitude and phase.

Now, let us consider the thickness of aluminum oxide formed on metallic aluminum. Based on Snell's law, amplitude reflectance (Fresnel coefficient) and intensity reflectance (energy reflectance), there is determined the relationship among the incident angle and wavelength of the light beam and the refractive indexes of aluminum oxide film and aluminum metal layer, so that the S-component reflectance can be controlled by the selection of thickness of the aluminum oxide film. This is shown in FIG. 3 representing the dependence of S-component reflectance on the film thickness.

Since the rotary polygon mirror composed of 10 aluminum alloy is used for example in an incident angle range of $9°-56°$ as explained above, there is required a flat reflectance characteristic within said range.

Figure 3:
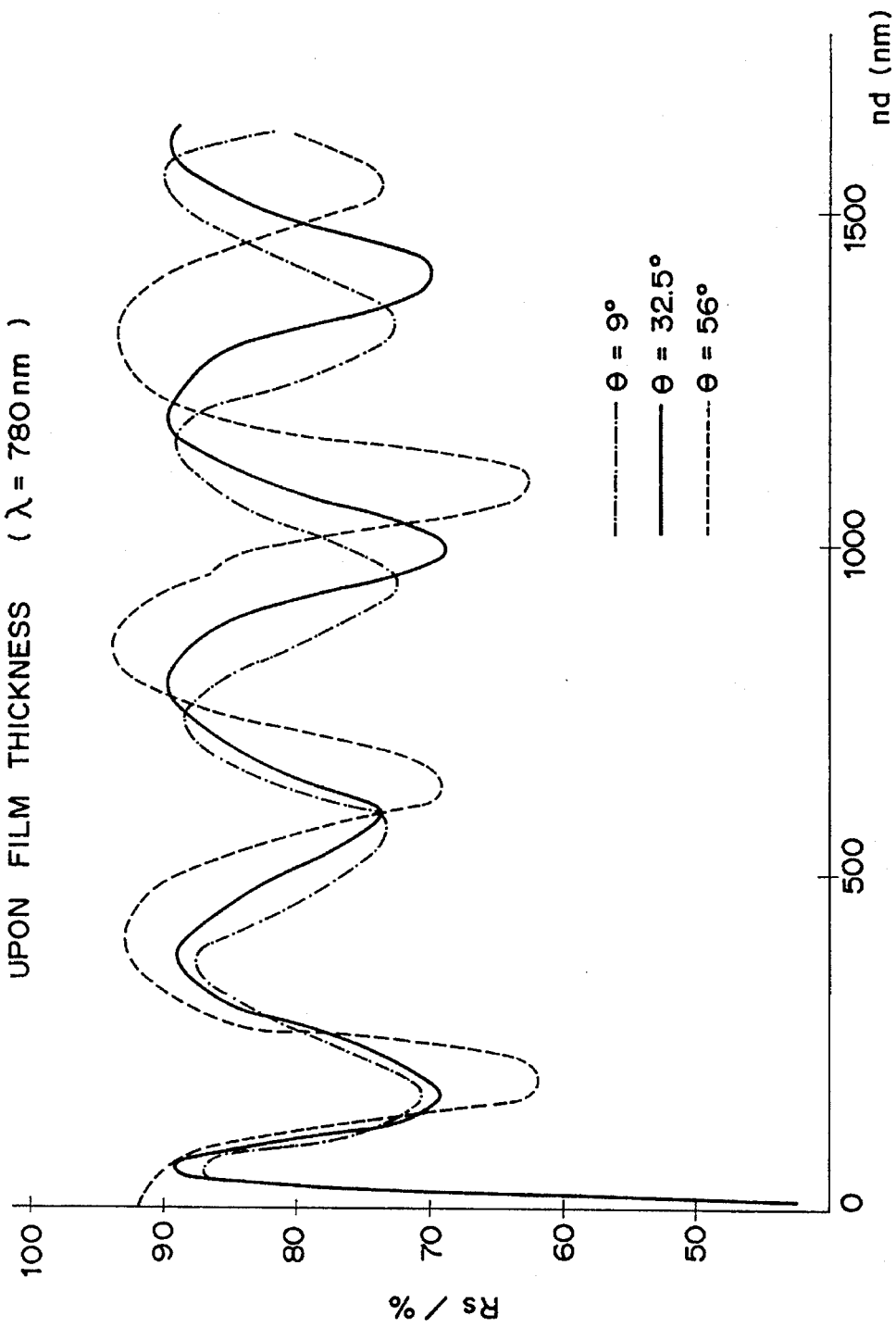
FIGS. 3 and 9 are charts showing the dependence on film thickness of S-component reflectance.

As shown in FIG. 3, a flat S-component reflectance can be obtained at several optical film thicknesses, with the fluctuation of S-component reflectance within several per cent over a range of the optical film thickness of several tens of nanometers. For a wavelength of the semiconductor laser of $\lambda=780$ nm, a flat S-component reflectance over an incident angle range of $9°-56°$ can be obtained at an optical film thickness (nd) of the anodized oxide film of 1240, 770, 596, 300 or 160 nm.

The range of optical film thickness (nd) capable of maintaining the S-component reflectance within a fluctuation of 5% is:

1215–1265nm($\lambda/0.64-\lambda/0.61$);

720–820 nm($\lambda/1.08-\lambda/0.95$);

582–609 nm($\lambda/1.34-\lambda/1.28$);

250–350 nm($\lambda/3.12-\lambda/2.23$); or

142–180 nm($\lambda/5.5-\lambda/4.3$).

Figure 4:
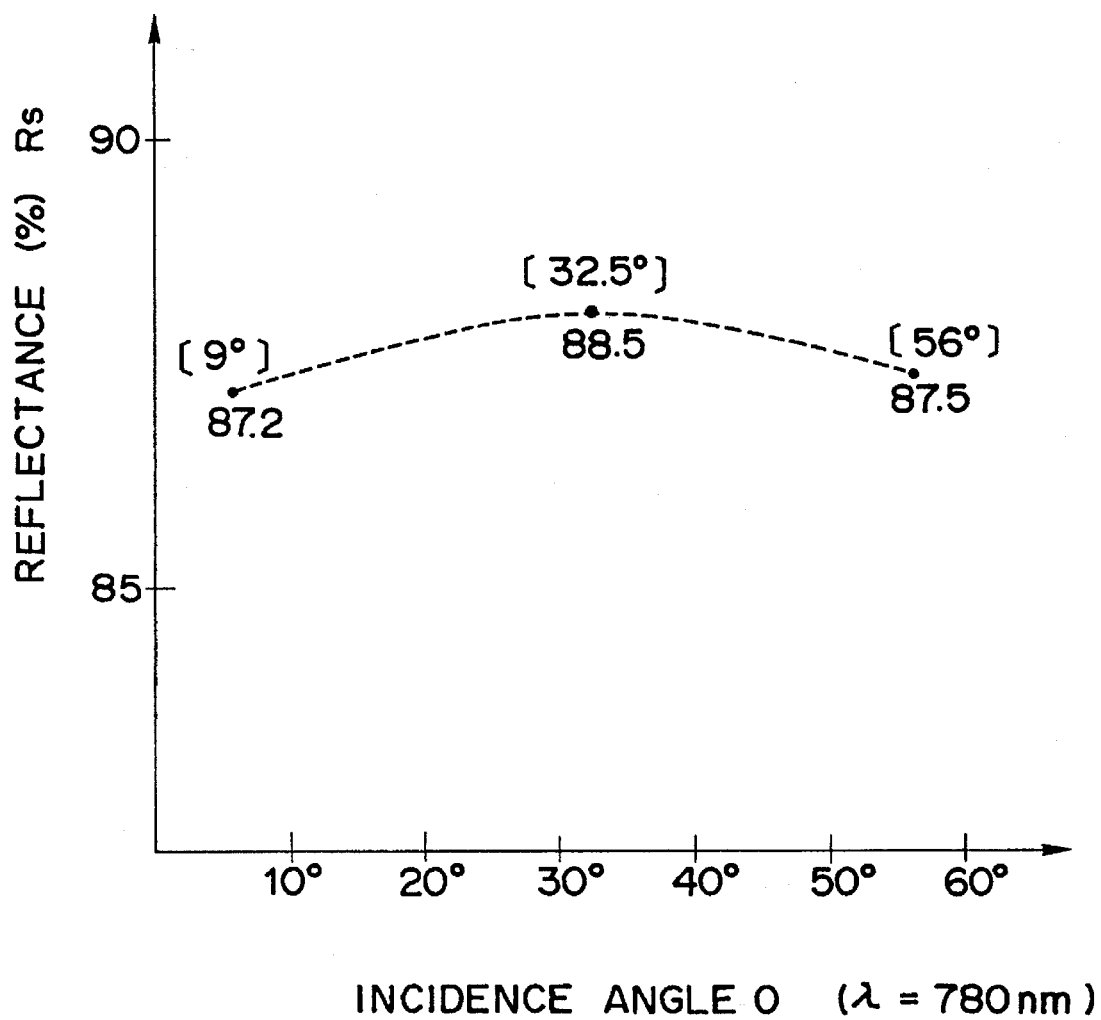
FIG. 4 is a chart showing the angular dependence of S-component reflectance.

FIG. 4 shows the angular dependence of reflectance in case of a semiconductor laser wavelength $\lambda=780$ nm and an optical film thickness of anodized oxide film of 1240 nm. The ordinate indicates the S-component reflectance Rs while the abscissa indicates the incident angle $\theta$. As will be apparent from FIG. 4, there can be obtained a high S-component reflectance with a fluctuation within 2%.

In the foregoing there has been explained a rotary polygon mirror as an example of the light deflector, but the same principle is applicable to a sinusoidally vibrating mirror with only one reflecting face, such as a Galvano mirror.

Figure 5:
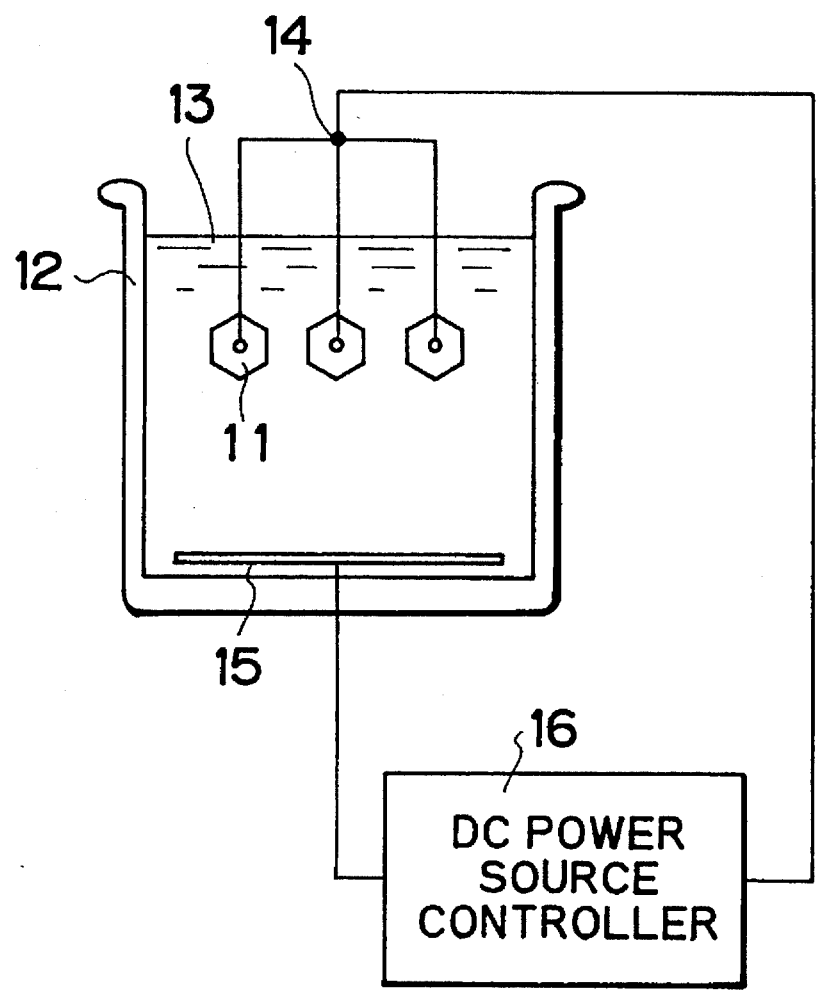
FIG. 5 is a view showing an anodizing method.

The rotary polygon mirror 4 is principally composed of aluminum, and the aluminum oxide film is formed on the deflecting reflection faces in the following manner. FIG. 5 illustrates the principle of anodic oxidation.

[Anodic oxidation method]

Referring in FIG. 5, rotary polygon mirrors 11 of an aluminum alloy are placed in an electrolytic tank 12 filled with electrolyte solution 13 (boric acid-ammonium borate buffer). In the lower part of the electrolyte there is provided an electrode which is connected to a DC power source 16.

When a voltage is applied between the anode 14 and the cathode 15, an oxidation reaction proceeds from the surface of the polygon mirror toward the interior thereof, thereby generating aluminum oxide.

The aluminum oxide protective film is thus formed, and the thickness thereof can be precisely controlled by the current density between the electrodes and the time.

As said reaction proceeds simultaneously on all the faces in contact with the electrolyte, the aluminum oxide layer could be simultaneously formed with a same thickness on all the deflecting reflections faces by a suitable arrangement of the electrodes.

The oxidation reaction was conducted for example with a constant current of 4 mA/cm$^2$ and with a voltage up to 100 V, and the current was terminated when the optical film thickness of said aluminum oxide film reached 165 nm.

The rotary polygon mirror of aluminum alloy prepared as explained above showed, in the evaluation of optical characteristics, an almost constant S-component reflectance for a wavelength $\lambda$=780 nm over a range of incident angle $\theta$ of 9°–56°, with an incident angular dependence within 2%. Besides the characteristic is stable as the incident angle dependence is limited within a wide range of the optical film thickness (nd) of the aluminum oxide film of 142–180 nm ($\lambda$/5.5–$\lambda$/4.3).

Additive components and impurities of the aluminum alloy are shown in Table 1.

As will be apparent from Table 1, in order to improve the working ability of aluminum alloy, there is preferred a Mg content of 2.5–5.5 wt. %, more preferably 3.5–4.5 wt. %.

Si is preferably not present as it is oxidized faster than Al, but the presence of a small amount is tolerated in consideration of the working ability. The Si content is preferably 0–0.5 wt. %, more preferably 0.05 wt. % or less. The total amount of other impurities is most preferably 0.001 wt. % or less.

TABLE 1

| | Influence of additive components and impurity in aluminum alloy | | | | |
|---|---|---|---|---|---|
| Sample | Additive component wt. % Mg | Si | Impurities wt. % | Pitting corrosion/ Surface state | Film peeling | Overall evaluation |
| #1 | 4.24 | 0 | 0.001 | + | + | ++ |
| #2 | 2.58 | 0.05 | 0.01 | – | ± | + |
| #3 | 0.80 | 0.33 | 0.1 | – | – | – |

Note:
++ Excellent
+ Good
± Medium
– Poor

Particularly the influence of Fe and Cu was significant.

This process provided satisfactory results without any drawbacks affecting the optical characteristics of the rotary polygon mirror such as pitting corrosion, not only in the step for forming the aluminum oxide film but also in the preceding and ensuing steps.

The electrolyte usable in the anodic oxidation is not limited to the boric acid-ammonium borate buffer explained above.

[PVD method]

A rotary mirror member, obtained by mirror finishing of the aluminum alloy same as that used in the above-explained anodic oxidation, was cleaned with solvent, and mounted on a substrate holder with a rotating mechanism of a vacuum evaporation apparatus. Alumina crystals of ca. 2 cc was loaded as the evaporation source to be heated by electron beam, and the vacuum chamber was evacuated by a rotary oil pump and an oil diffusion pump. When the pressure in the chamber reached 5×10$^{-4}$ Pa after about 15 minutes from the start of the oil diffusion pump, the rotary mirror member was heated to a surface temperature of about 150° C. by a substrate heating device incorporated in the chamber. After the chamber was again evacuated to a pressure of 5×10$^{-4}$ Pa, the electron beam heater was activated to melt the alumina crystal while the shutter of the evaporation source is closed, thereby eliminating wafer and gas contained in said crystals or present therearound.

Then the substrate holder, with a mechanism for rotating the substrate by itself and around the source, is put into motion whereby the mirror faces of the rotary mirror member face the evaporation source in succession. The dose of the electron beam was increased to obtain a evaporation rate of ca. 20 Å/sec. and the shutter of the evaporation source was opened to form a thin aluminum oxide film on each mirror face of the rotary mirror member.

Said shutter was closed to terminate the growth of aluminum oxide film on said mirror faces, when the optical film thickness (nd) of the aluminum oxide film reached 250–350 nm ($\lambda$/3.12–$\lambda$/2.23, $\lambda$=780 nm). After the vacuum evaporation apparatus was deactivated by the predetermined procedure, the optical performance of thus prepared rotary mirror of aluminum alloy was evaluated. The reflectance of S-polarized light at a wavelength of 780 nm was almost constant over an incident angle range of 9°–56°, with fluctuation of 5% or less. Besides, since the incident angle dependence was little over a wide range of optical film thickness of 250–350 nm, there could be obtained rotary mirrors of stable performance. In this manner the aluminum oxide film can be obtained also by the PVD (evaporation or sputtering) method.

[CVD method]

A rotary mirror member, obtained by mirror finishing of the aluminum alloy same as that used in the above-explained anodic oxidation, was cleaned with solvent, and mounted on a substrate holder of a vacuum reaction chamber.

Said chamber was evacuated by a rotary oil pump and an oil diffusion pump. When the pressure in said chamber reached 5×10$^{-4}$ Pa after about 15 minutes from the start of the oil diffusion pump, the rotary mirror member was heated to a surface temperature of ca. 300° C. by a substrate heater incorporated in the reaction chamber.

After the chamber was again evacuated to 5×10$^{-4}$ Pa, a gas valve connected thereto was suitably opened to introduce a 1:9 oxygen-argon mixture with a rate of 40 cc/min. Also another gas valve was opened to introduce gasified trimethylalumminum at a rate of 10 cc/min.

Then a conductance value (evacuation regulating valve) positioned between the reaction chamber and the oil diffusion pump was suitably regulated to obtain a pressure of ca. 0.1 Pa in the reaction chamber, thereby depositing aluminum oxide on the rotary mirror member. The introduction of trimethylaluminum gas was terminated when the optical film thickness (nd) of the aluminum oxide film reach 250–350 nm ($\lambda$/3.12–$\lambda$/2.23, $\lambda$=780 nm).

Then the introduction of oxygen and argon gas was terminated. The conductance valve was fully opened, the substrate heater was deactivated, and the rotary mirror member was left until it reached a temperature of 50° C. or lower.

After the function of the vacuum reaction chamber was terminated according to a predetermined procedure, the optical performance of thus prepared rotary mirror member of aluminum alloy was evaluated. The reflectance of the S-polarized light of a wavelength of 780 nm was almost constant within an incident angle range of 9°–56°, with a fluctuation of 5% or less. Besides, since the incident angle dependence was little over a wide range of optical film thickness of 250–350 nm, there could be obtained rotary mirrors of stable performance. In this manner the aluminum oxide film can be obtained also by the CVD (plasma CVD or thermal CVD) method.

[Chemical treatment method]

A rotary mirror member, obtained by mirror finishing of the aluminum alloy same as that used in the above-explained anodic oxidation, was cleaned with solvent, and mounted on a holder for chemical treatment. It was subsequently immersed in treating liquid containing 0.3% of ammonia in deionized water.

The treating liquid was maintained at 95°–100° C. and vigorously agitated, thereby forming aluminum oxide on the surface of the rotary mirror member. The rotary mirror member was taken out after several minutes when the optical film thickness (nd) of the aluminum oxide film reached 142–180 nm ($\lambda/5.5$–$/4.3$, $\lambda=780$ nm).

After ammonia water was completely rinsed with deionized water, the optical performance of thus prepared rotary mirror of aluminum alloy was evaluated. The reflectance of S-polarized light of a wavelength of 780 nm was almost constant, with fluctuation of 5% or less. Besides, since the incident angle dependence was little over a wide film thickness range of 142–180 nm, there could be obtained rotary mirrors of stable performance. In this manner the aluminum oxide film can also be obtained by chemical treatment.

[Sol-Gel method]

A rotary mirror member, obtained by mirror finishing of the aluminum alloy same as used in the aforementioned anodic oxidation method were cleaned with solvent, and mounted on a dipping holder by the center hole of the mirror members, with dummy substrates on both ends for preventing liquid dripping.

A dipping solution of basic aluminum lactate was placed in a tank and maintained at ca. 10° C. The above-mentioned substrate holder, mounted on a holder supporting jig, was immersed in said solution for 30 seconds and was then lifted with a speed of 70 mm/min. The substrates were then dried to a touch dry state for 30 minutes at 100° C. and baked for 1 hour at 350° C. The above-mentioned conditions are not limitative as long as the optical film thickness (nd) of the aluminum oxide film becomes 582–609 nm ($\lambda/1.34$–$\lambda/1.28$, $\lambda=780$ nm). After returning to the room temperature, thus prepared rotary mirror members were subjected to the measurement of optical performance. The reflectance of the S-polarized light with a wavelength of 780 nm was almost constant within an incident angle range of 9°–56°, with fluctuation of 5% or less. Besides, since the incident angle dependence was little over a wide range of optical film thickness of 582–609 nm, there could be obtained rotary mirrors of stable performance. In this manner the aluminum oxide film can also be obtained by the Sol-Gel method.

As explained in the foregoing, the light deflector of the present invention, principally composed of an aluminum alloy and used for light beam scanning, is provided, on the deflecting reflection faces thereof, with an aluminum oxide film of an optical film thickness (nd) of:

$\lambda/5.5$–$\lambda/4.3$;

$\lambda/3.12$–$\lambda/2.23$;

$\lambda/1.34$–$\lambda/1.28$;

$\lambda/1.08$–$\lambda/0.95$; or wherein $\lambda$ is the wavelength of the scanning light. The incident light to said deflecting reflection faces is S-polarized, namely polarized perpendicularly to the reflection section (plane including the incident light, reflected light and refracted light).

The above-explained light deflector of the present invention is capable of forming the aluminum oxide film with an optimum optical thickness, in consideration of the refractive index of aluminum substrate, and wavelength and angle of the incident light, thereby providing an advantage of minimizing the dependence on the incident angle.

Besides the present invention is capable of providing light deflector of stable performance, because the deflecting faces have satisfactory properties without film peeling, and also because the dependence on the incident angle is little over a wide range of optical film thickness.

Also since said film can achieve sufficient effect with a single layer, the time required for film formation can be reduced so that a significant economical effect can be obtained.

Also, the light deflector of the present invention, principally composed of an aluminum alloy and used for light beam scanning, is preferably composed of an aluminum alloy with a Mg content within a range of 2.5–55 wt. %, a Si content within a range of 0–0.5 wt. %, and a content of other impurities not exceeding 0.001 wt. %.

Such aluminum alloy, with defined amounts of Mg and Si for maintaining desirable mirror finishing properties in the aluminum alloy, and with scarce contents of other impurities, provides the advantages of not causing abnormality in the surface properties of the reflection faces in the protective film forming step and in the preceding and succeeding steps, and also not causing undesirable effects on the protective film thus formed.

In the following there will be explained another embodiment of the present invention.

The scanning optical device, such as of a laser beam printer, generally employs a semiconductor laser as the light source. Because of its structure, the semiconductor laser emits a linearly polarized light beam, with a diverging angle different in the polarized direction and in the perpendicular direction. Also in the recording of image information by scanning a photosensitive member constituting the recording medium, as disclosed in the Japanese Patent Laid-open Application 52-119331, the image quality is improved by selecting the diameter of the light beam spot in the main scanning direction of the light deflector smaller than in the sub scanning direction (direction including the optical axis and perpendicular to the main scanning direction).

When the diaphragm 3 shown in FIG. 1 is circular, the direction of larger diverging angle of the semiconductor laser (direction perpendicular to the junction plane of the laser) has been selected as the main scanning direction, in consideration of the foregoing conditions, as such selection can reduce the spot diameter and can improve the efficiency of utilization of the laser.

More specifically, if the semiconductor laser is so positioned as to form a beam spot elongated in the sub scanning direction on the scanned plane, the polarizing plane of the emitted light beam lies in the sub scanning direction, because of the nature of semiconductor laser. Such light beam enters the deflecting reflection planes of the light deflector in S-polarized state.

However, such light beam entering the deflecting reflection plane of the rotary polygon mirror in the S-polarized state results in a drawback of a large incident angle dependence of the reflectance, by the error in thickness of the aluminum oxide film formed on said reflection planes.

Figure 6:
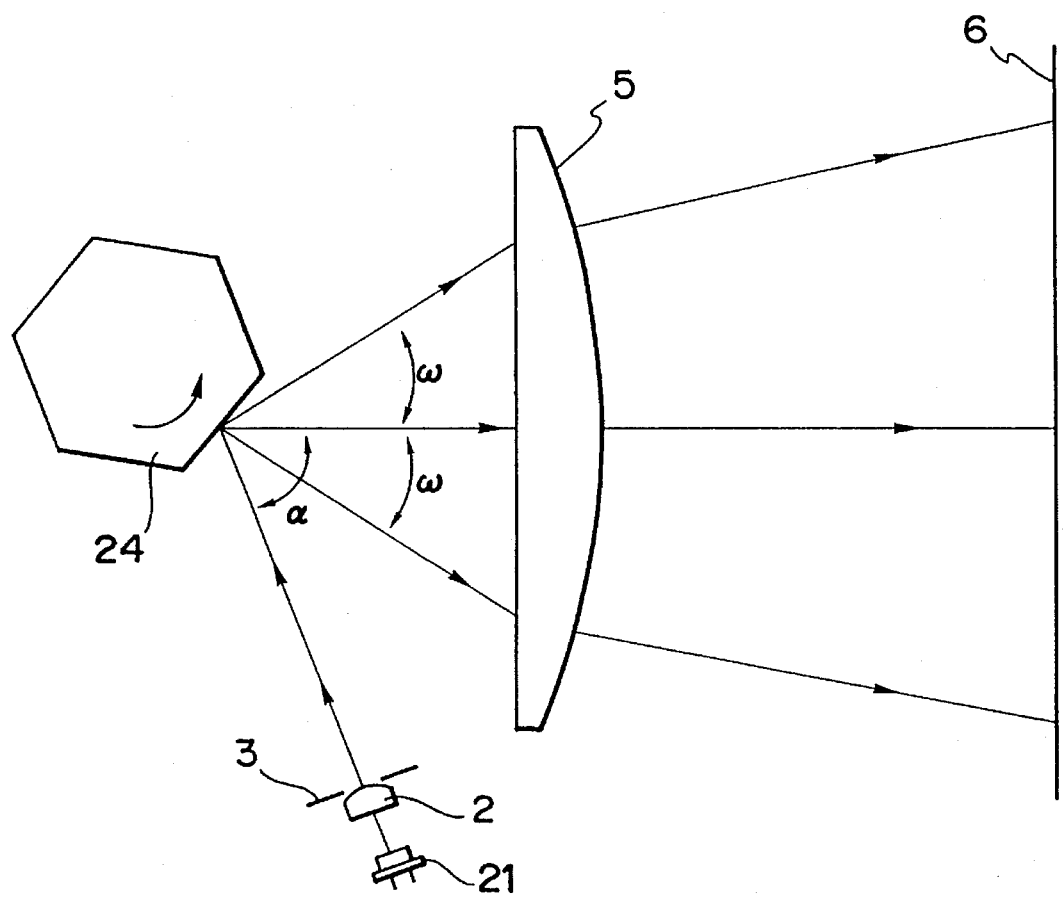

FIG. 6 is a plan view of a scanning optical device employing the rotary polygon mirror of the present invention, showing the function in a main scanning plane parallel to the deflection plane (a plane formed in time by the light beam deflected by the deflecting reflection face of the light defector).

Referring to FIG. 6, a light beam emitted from a semiconductor laser 21 constituting the light source is converted into a substantially parallel beam by a collimating lens 2. In the vicinity of said lens there is provided a diaphragm 3 for defining the size of the light beam. The light beam transmitted by the diaphragm 3 enters, in the P-polarized state, the deflecting reflection plane of a light deflector consisting of a rotary polygon mirror 24, in such a manner that the polarizing direction is parallel to the main scanning plane. Thus, on the deflecting reflection plane of the rotary polygon mirror, the incident light beam is P-polarized, namely the polarizing direction is parallel to the reflection plane (plane including the incident light, reflected light and refracted light). Stated differently, the light beam emitted by the semiconductor laser and entering the rotary polygon mirror is polarized in a direction parallel to the deflecting plane.

The rotary polygon mirror 24 is rotated at a high speed, whereby the light beam entering the deflecting reflection plane is deflected at a high speed. The deflected light beam is subjected to the correction of fθ characteristics by an fθ lens 5 and is focused on a photosensitive member 6 constituting a scanned plane, thereby performing linear scanning.

Around the photosensitive member there are provided a corona charger for uniformly charging the surface of the photosensitive member, a developing unit for developing an electrostatic latent image formed on said photosensitive member into a visible toner image, and a transfer corona charger for transferring said toner image onto a recording sheet (all these components not shown), whereby information corresponding to the light beam generated by the semiconductor laser 21 is recorded on the recording sheet.

The effective light beam scanning angle is defined as $2\omega$ as shown in FIG. 6, and the angle between the light beam before entry into the rotary polygon mirror and the center of said effective deflection angle $2\omega$ is defined as $\alpha$. The incident angle and reflection angle of the light beam, with respect to the normal line to the reflection plane of the rotary polygon mirror 24 in the effective scanning range, vary with the rotation of the polygon mirror, and said varying range can be represented as $(\alpha-\omega)/2 \sim (\alpha+\omega)/2$.

If the polygon mirror has 6 reflecting faces with $\omega=45°$ and $\alpha=65°$, the incident angle θ of the light beam to the reflecting face varies within a range of 10°–55° by the rotation of the polygon mirror.

The light from the semiconductor laser 21 is linearly polarized, and enters the deflecting reflection plane of the rotary polygon mirror in the P-polarized state. Consequently the narrower one θ of the diverging angles of the semiconductor laser 21 corresponds to the main scanning direction. The collimating lens 2 has an F number of 5.5 in the main scanning direction, with respect to the diaphragm 3. The rotary polygon mirror 24 is composed of aluminum, with an aluminum oxide film on the surface of mirror faces (reflection planes) thereof, with an optical film thickness of 108 nm.

Figure 7:
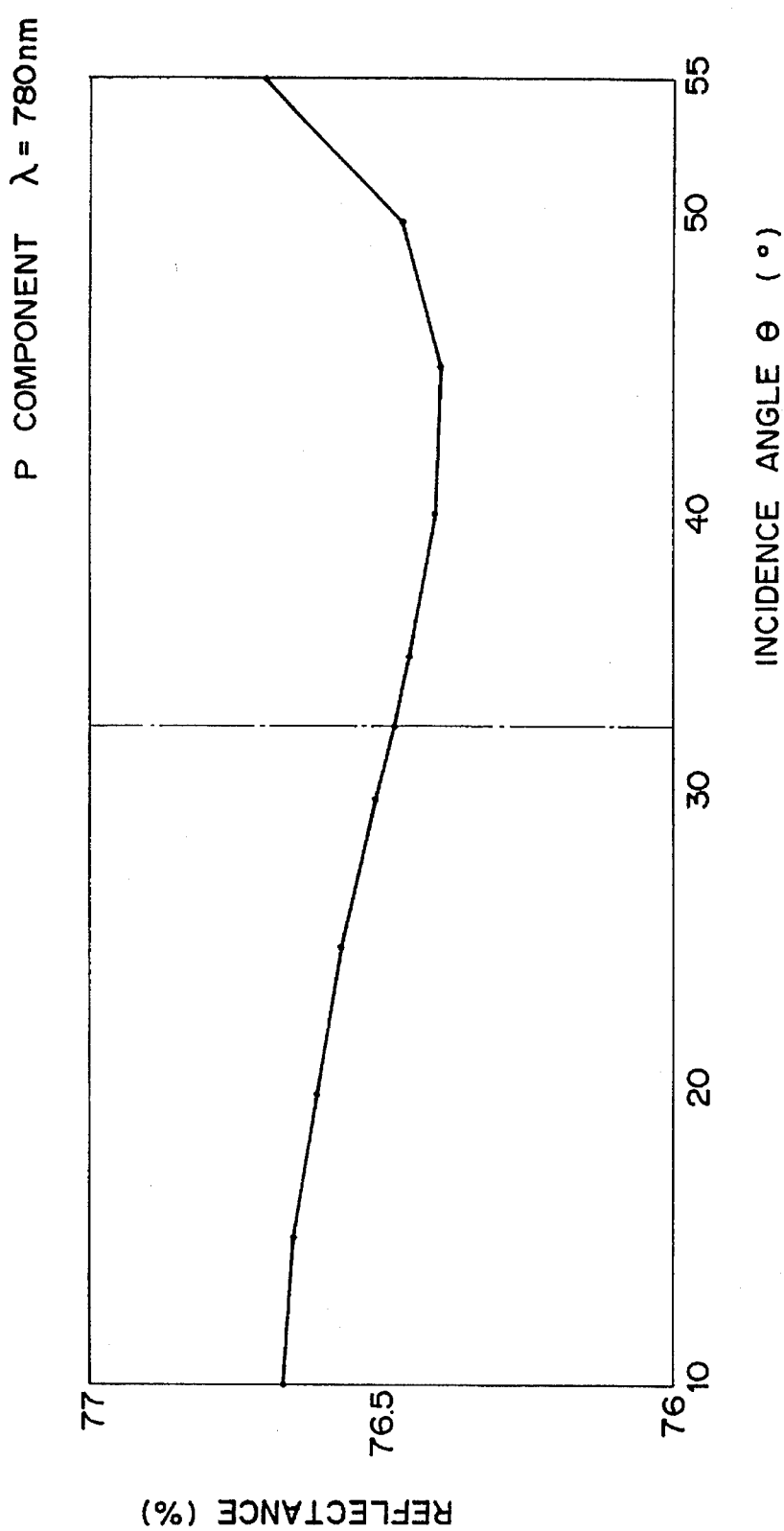
FIGS. 7 and 10 are charts showing the angular dependence of P-component reflectance.

FIG. 7 shows the calculated incident angle dependence of the reflectance of the deflecting reflection face within an incident angle range of 10°–55° in which said rotary polygon mirror is used. As shown in FIG. 7, the incident angle dependence in the present embodiment is satisfactory, as small as ca. 0.3%. Also the variation in the reflectance, resulting from the variation in the thickness of aluminum oxide film, is relatively small.

Figure 8:
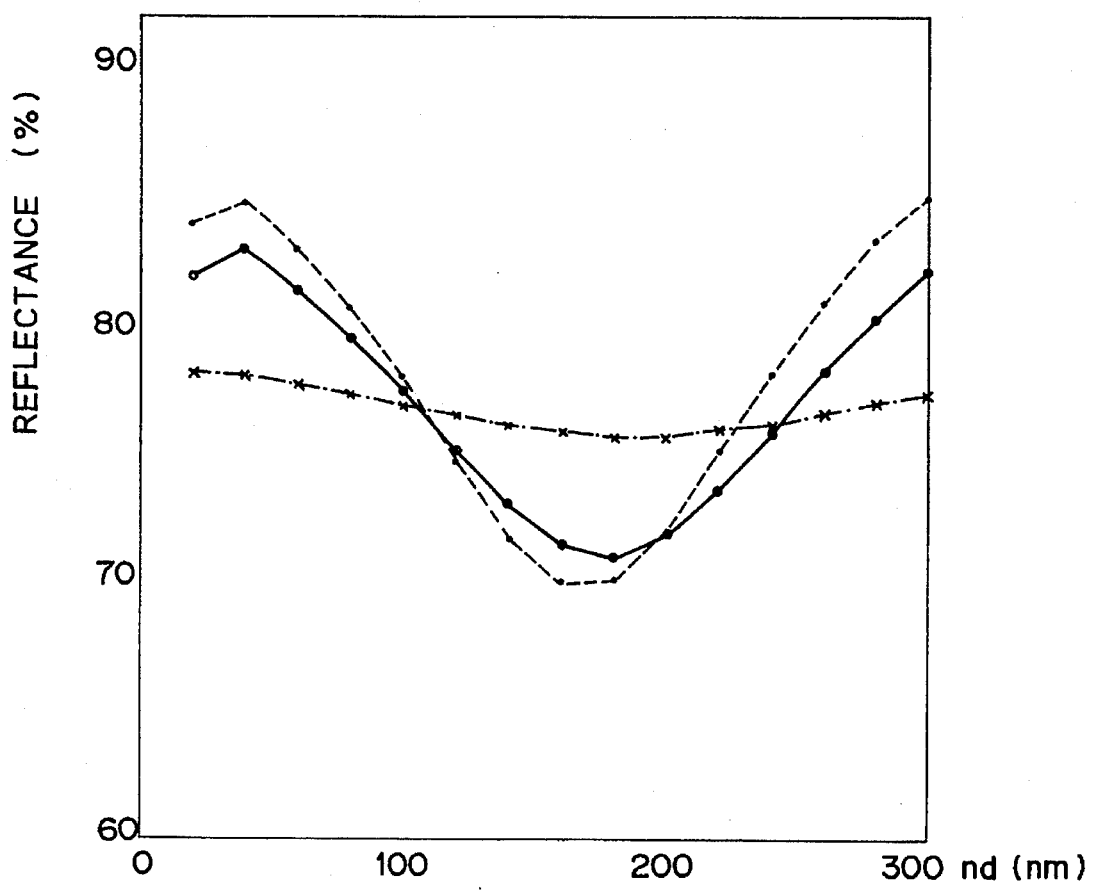
FIGS. 8 and 11 are charts showing the dependence on film thickness of P-component reflectance.
Figure 9:
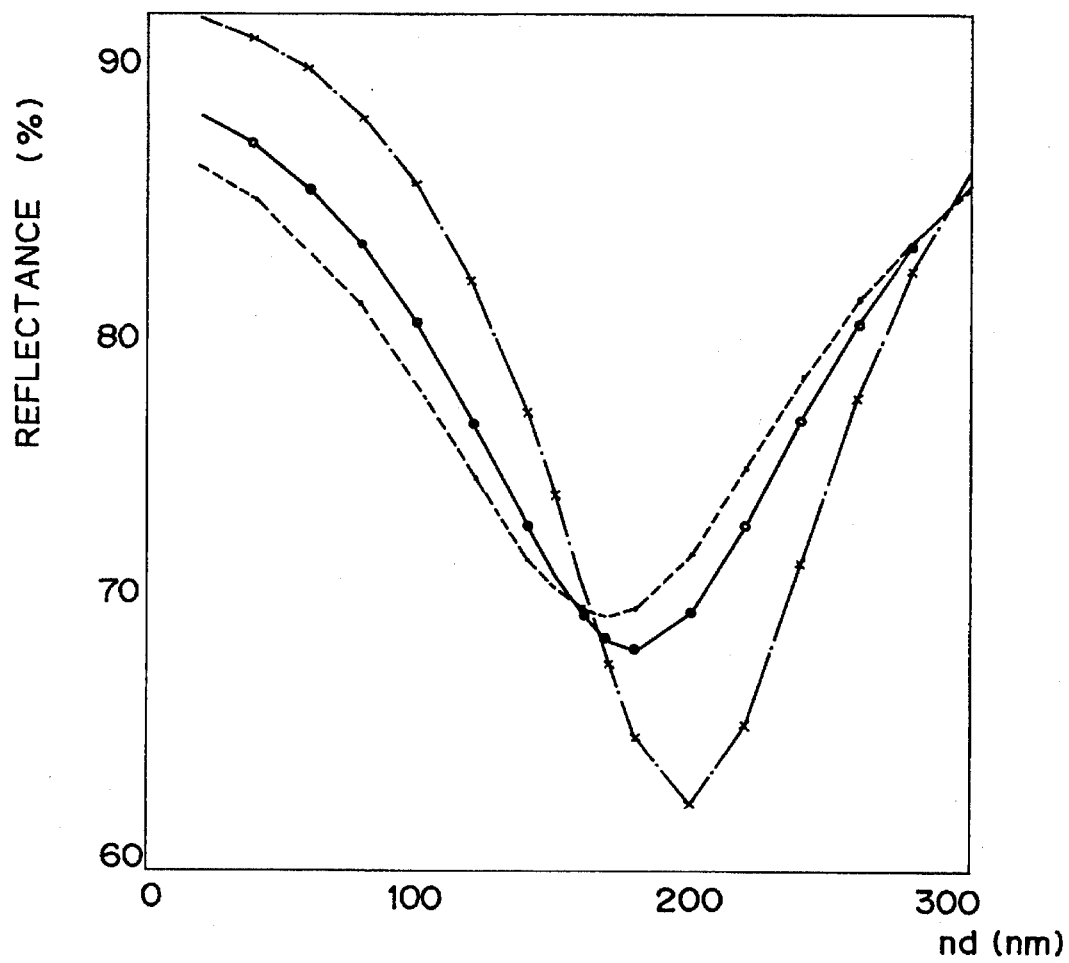

For the purpose of comparison, FIG. 8 shows variation of the reflectance of the deflecting reflection face for the P-polarized light, generated by the variation in the film thickness at the maximum, center and minimum of the incident angle. Also FIG. 9 shows similar variation of the reflectance, generated by the variation in the film thickness, for the S-polarized light.

As will be apparent from the curves in these charts, the angle dependence of reflectance becomes small at film thicknesses around 163 and 286 nm, but the variation of reflectance by film thickness is smaller in case of FIG. 8 where the light is P-polarized.

When the semiconductor laser is used in the P-polarized state with respect to the deflecting reflection face of the light deflector, a narrower one of the light diverging angle (FFP angle) from the light emitting part of the semiconductor laser is used. If the light amount distribution varies on the diaphragm due to a fluctuation in said FFP angle, the spot diameter varies on the scanned plane. For this reason, in a FFP angle range of 7°–20° in the main scanning direction (angular range where the light amount becomes 50% of the maximum light amount), the F-number in the main scanning direction at the side of the semiconductor laser is selected at 4 or larger, thereby reducing the variation in the spot diameter in the main scanning direction on the scanned plane, by the FFP angle.

The optical film thickness nd of the $Al_2O_3$ film deposited on the Al deflecting face is preferably 108 nm (0.14λ, λ=780 nm), the case shown in FIG. 8.

In the usually used conditions of $\alpha=40°-90°$ and $\omega=25°-60°$ in FIG. 6, the incident angle to the normal line to the deflecting reflection face is generally selected as a part within a range of 0°–75°. Thus, by selecting the optical thickness of the aluminum oxide film within a range of λ/11.1–λ/5.0, it is rendered possible to reduce the incident angle dependence of the reflectance, also the incident angle dependence of the reflectance as a function of variation in film thickness, and the variation in the reflection characteristics resulting from variation in film thickness. The thickness of the $Al_2O_3$ film is preferably 40 nm or larger, since the protecting effect of the film becomes weaker at a thickness less than 40 nm.

The formation of aluminum oxide film on the aluminum surface is generally conducted by vacuum evaporation, but it is preferably achieved by anodic oxidation in the rotary polygon mirror of the present embodiment.

The anodic oxidation is effective genenerally for formation of a film of 200 nm or less, when emphasis is given to the cost rather than the film forming time. The film formation by anodic oxidation may result in a shift or a gradation in the film thickness, due to locally uneven current density depending on the shape of the rotary polygon mirror or in case plural members are placed for mass production, but the present invention is also applicable in such case.

In the following there will be given numerical parameters of another embodiment of the present invention, of which structure is same as shown in FIG. 6.

Figure 10:
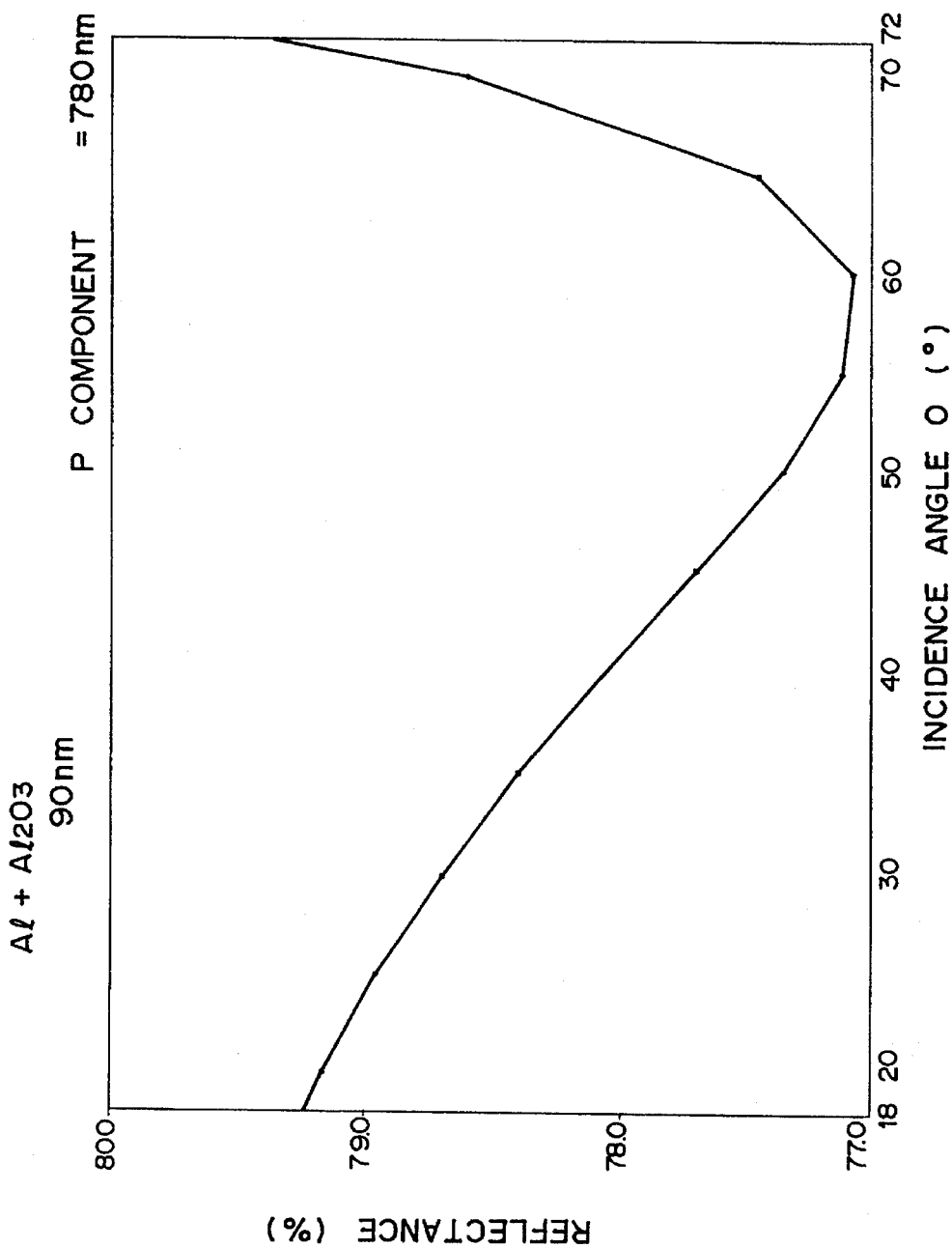

In this embodiment, in the structure shown in FIG. 6, there were employed $\alpha=90°$, $\omega=54°$, wavelength $\lambda=780$ nm, and incident angle range of 18°–72° to the deflecting reflection face. The rotary mirror was composed of aluminum, and $Al_2O_3$ was deposited by evaporation, on the deflecting reflection faces, with an optical film thickness of 90 nm (0.115$\lambda$). FIG. 10 shows the angle dependence of reflectance for the P-polarized light in this embodiment.

Figure 11:
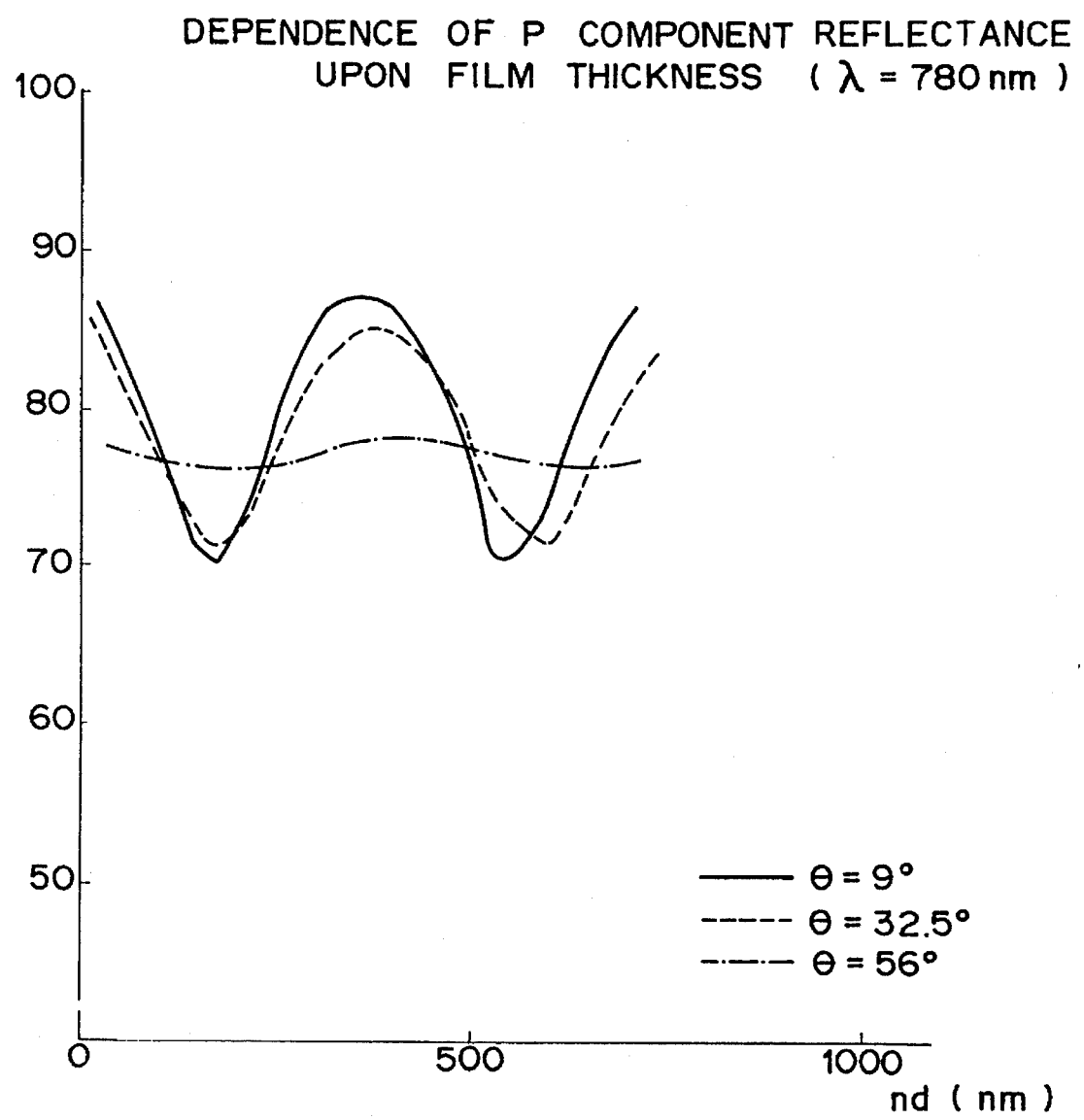

FIG. 11 shows the change in reflectance $R_p$ of the deflecting reflection face for the P-polarized component, in coordinate, as a function of the optical film thickness (nd) of the anodic oxide film in abscissa.

The range of optical film thickness (nd) in which the variation in reflectance of P-polarized component is within 5% is 70–156 nm ($\lambda/11.1-\lambda/5.0$), 190–270 nm ($\lambda/4.11-\lambda/2.89$), 451–531 nm ($\lambda/1.73-\lambda/1.47$) or 609–650 nm ($\lambda/1.28-\lambda/1.20$).

Also the range of optical film thickness (nd) in which the variation in reflectance of P-polarized component is within 3% is: 83–110 nm ($\lambda/9.4-\lambda/7.09$), 216–243 nm ($\lambda/3.61-\lambda/3.21$) or 479–510 nm ($\lambda/1.63-\lambda/1.53$).

In the foregoing explanation, rotary polygon mirrors have been explained as an example of light deflector, but the present invention is likewise applicable to a mirror with only one reflection face such as a Galvano mirror.

The light deflector of the foregoing embodiment causes the linearly polarized light beam from the laser to enter the deflecting reflection face of the light deflector in the P-polarized state, and, when the light deflector is composed of aluminum with an aluminum oxide film on the reflection faces for increasing the reflectance, allows to suppress variation in the reflectance resulting from fluctuation in the thickness of said aluminum oxide film or resulting from variation in the incident angle, thereby enabling a precise scanning operation with uniform amount of light. In the case of P-polarized state mentioned above, the optical film thickness (nd) of aluminum oxide is 70–156 nm ($\lambda/11.1-\lambda/5.0$), 190–270 nm ($\lambda/4.11-\lambda/2.89$), 451–531 nm ($\lambda/1.73-\lambda/1.47$), or 609–650 nm ($\lambda/1.28-\lambda/1.20$).

According to the present invention, as explained in the foregoing, when the light deflector is made of aluminum with an aluminum oxide ($Al_2O_3$) film for improving the reflectance on the deflecting reflection faces, the linearly polarized light from the laser light source is made to enter said deflecting reflection faces in the S- or P-polarized state, thereby reducing the variation in reflectance resulting from fluctuation in the thickness of said aluminum oxide film or from the incident angle, thus achieving precise scanning operation on the scanned plane with a uniform amount of light.

We claim:

1. A light deflector comprising:
    a light deflector member of a material principally composed of an aluminum alloy; and
    an aluminum oxide film formed on deflecting reflection face(s) of said light deflector member;
    wherein the optical film thickness (nd) of said aluminum oxide film is within a range of:
    $\lambda/11.1-\lambda/5.0$;
    $\lambda/4.11-\lambda/2.89$;
    $\lambda/1.73-\lambda/1.47$; or
    $\lambda/1.28-\lambda/1.20$
    wherein the light incident to said deflecting reflection face(s) is P-polarized light with a wavelength $\lambda$; and
    wherein reflectance of the incident light is substantially constant when the angle of incidence on the reflection face(s) is between 10° and 55°.

2. A light deflector according to claim 1, wherein said aluminum oxide film is formed by anodic oxidation method.

3. A scanning optical device, comprising:
    a light source; and
    a light deflector for deflecting a light beam from the light source, said light deflector including:
    a light deflector member of a material principally composed of an aluminum alloy; and
    an aluminum oxide film formed on deflecting reflection face(s) of said light deflector member,
    wherein the optical film thickness (nd) of said aluminum oxide film is within a range of:
    $\lambda/11.1-\lambda/5.0$;
    $\lambda/4.11-\lambda/2.89$;
    $\lambda/1.73-\lambda/1.47$; or
    $\lambda/1.28-\lambda/1.20$;
    wherein the light incident to said deflecting reflection face(s) is P-polarized light with a wavelength $\lambda$; and
    wherein reflectance of the incident light is substantially constant when the angle of incidence on the reflection face(s) is between 10° and 55°.

4. A light deflector according to claim 3, wherein said aluminum oxide film is formed by anodic oxidation method.

5. An image recording device, comprising:
    a light source; and
    a light deflector for deflecting a light beam from the light source, said light deflector including:
    a light deflector member of a material principally composed of an aluminum alloy; and
    an aluminum oxide film formed on deflecting reflection face(s) of said light deflector member,
    wherein the optical film thickness (nd) of said aluminum oxide film is within a range of:
    $\lambda/11.1-\lambda/5.0$
    $\lambda/4.11-\lambda/2.89$;
    $\lambda/1.73-\lambda/1.47$; or
    $\lambda/1.28-\lambda/1.20$;
    wherein the light incident to said deflecting reflection face(s) is P-polarized light with a wavelength $\lambda$; and
    wherein reflectance of the incident light is substantially constant when the angle of incidence on the reflection face(s) is between 10° and 55°; and
    a photosensitive member for receiving the light beam deflected by said light deflector.

6. A light deflector according to claim 5, wherein said aluminum oxide film is formed by anodic oxidation method.

* * * * *